United States Patent [19]
Collin et al.

[11] Patent Number: 5,546,435
[45] Date of Patent: Aug. 13, 1996

[54] FISSION PRODUCT LEAK DETECTION IN A PRESSURIZED-WATER REACTOR

[75] Inventors: Per Collin; Roland Deleryd, both of Västerås; Roland Ivars, Ransta; Fredrik Lundqvist, Västerås, all of Sweden; Norman R. Stolzenberg, West Suffield, Conn.

[73] Assignee: ABB Atom AB, Västerås, Sweden

[21] Appl. No.: 341,153

[22] Filed: Nov. 16, 1994

Related U.S. Application Data

[63] Continuation-in-part of Ser. No. 977,032, Nov. 16, 1992, Pat. No. 5,383,226.

[51] Int. Cl.$^6$ .................................................. G21C 17/00
[52] U.S. Cl. .................... 376/253; 376/250; 376/251; 376/310; 376/256
[58] Field of Search .................................... 376/253, 250, 376/251, 310, 256, 439; 73/19, 19.12, 19.02, 28.04; 252/645

[56] References Cited

U.S. PATENT DOCUMENTS

| | | | |
|---|---|---|---|
| 3,878,040 | 4/1975 | Martucci | 376/253 |
| 3,929,570 | 12/1975 | Jones et al. | 376/450 |
| 4,248,666 | 2/1981 | Olsson | 376/253 |
| 4,537,740 | 8/1985 | Colburn | 376/256 |
| 4,650,637 | 3/1987 | Chubb | 376/253 |
| 4,816,209 | 3/1989 | Schweiger | 376/309 |
| 5,414,742 | 5/1995 | Hornak et al. | 376/251 |

Primary Examiner—Charles T. Jordan
Assistant Examiner—Meena Chelliah
Attorney, Agent, or Firm—Watson Cole Stevens Davis, P.L.L.C.

[57] ABSTRACT

The invention relates to an arrangement for carrying out leak detection of a fuel assembly for a pressurized-water nuclear reactor. A substantially vertical hollow mast means open in both ends houses the fuel assembly to be examined. The fuel assembly is drawn to the inside of the mast means from its lower side. The part of the mast means housing the fuel assembly is lifted to a position in which the fuel assembly is provided near but below the water surface of water inside the nuclear reactor. Water is sucked from a position inside the mast means above the fuel assembly. A gas separating means separates gases present in water sucked from the inside of the mast means. The separated gas is analyzed in a gas analyzing means regarding its amount of gaseous fission products.

6 Claims, 1 Drawing Sheet

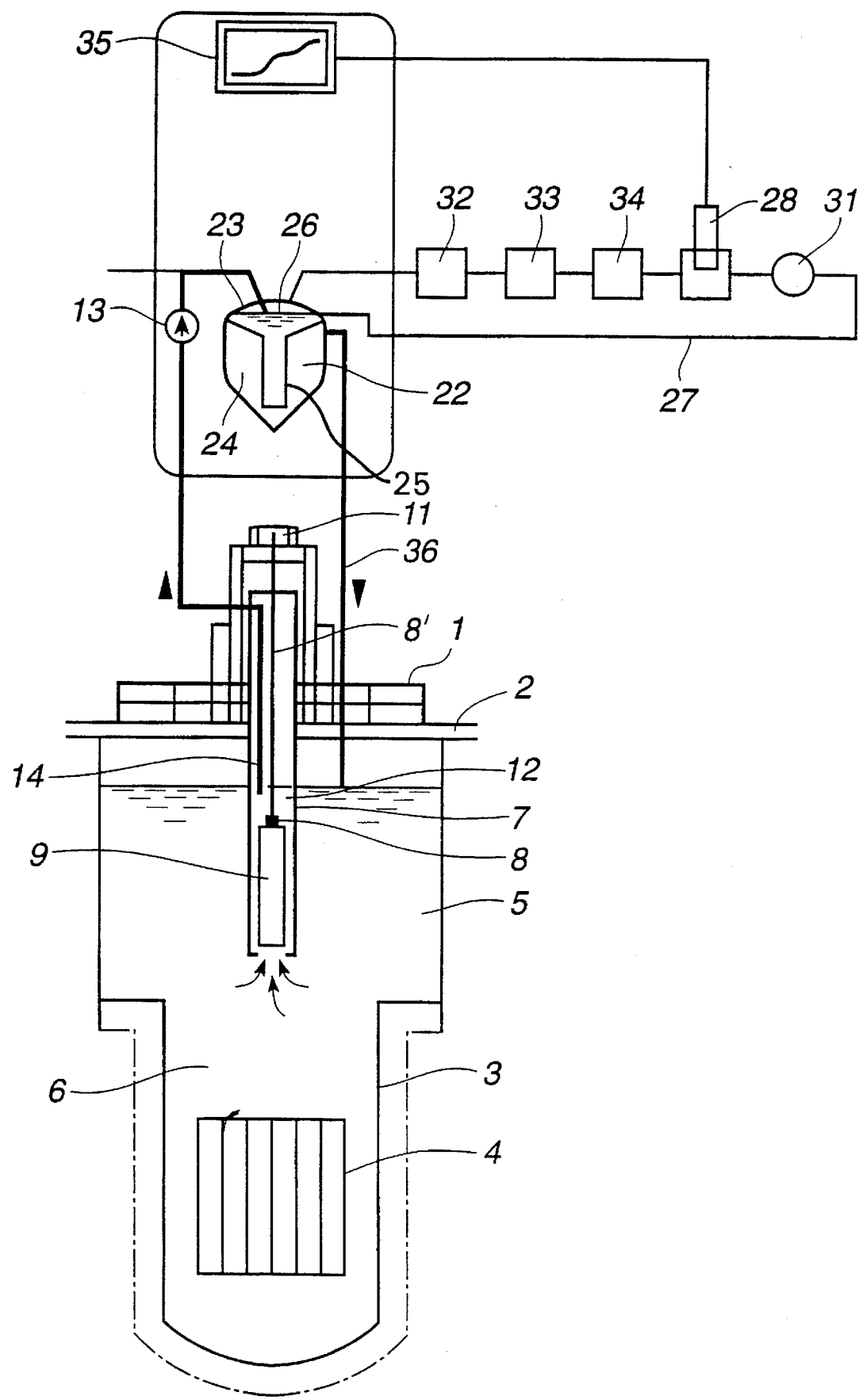

FISSION PRODUCT LEAK DETECTION IN A PRESSURIZED-WATER REACTOR

CROSS REFERENCE TO RELATED APPLICATIONS

This application is a continuation-in-part of U.S. application Ser. No. 977,032, filed Nov. 16, 1992 and which issued as U.S. Pat. No. 5,383,226 on Jan. 17, 1995.

This invention relates to a method of carrying out leak detection of a fuel assembly for a pressurized-water reactor (PWR).

BACKGROUND OF THE INVENTION

There are substantially two modern method for carrying out leak detection of a fuel assembly for nuclear light-water reactors. INMAST-sipping for PWR-reactor plants and TELESCOPE-sipping for BWR-reactor plants (BWR=Boiling-Water Reactor).

A leakage occurring leads to the reactor water and hence the different parts of the primary circuit of the reactor being contaminated with the radioactive fission products. When a contamination of the reactor water has been determined or is suspected to have occurred, it is of the utmost importance that the leakage is locted so that leaky fuel assemblys can be replaced and later repaired. A fuel assembly includes most often several fuel rods.

The so called INMAST-sipping is used for PWR-reactor plants and is a sipping method of conventional type, where a so called on-line gas detection is used.

At the INMAST-sipping, the fuel assembly suspected to be leaking is drawn into a suction hood, which preferably is the refuelling machine mast. The fission gases emitted from the fuel assembly are sampled in the upper part of the hood, and thereafter detected in a gas detection circuit. The gas volume in which an amount of fission gas from a damaged fuel assembly is emitted is quite voluminous. This gives the result that the detection sensitivity is quite low.

The FR-2509898 describes a fuel leak detection for a PWR in which the unit of a fuel assembly drawn into a suction hood is lifted up several meters well above the reactor core in order to increase the internal relative pressure of the rods in relation to the water pressure but so that the fuel assembly is still surrounded by water. The gas emitted in the water and then in a gas volume above the water level in the hood is sucked from the upper part of the hood, which then is closed but for the gas sucking device. The possible content of radiactive fission products in the sucked gas is examined. The detection sensitivity is quite low. In order to increase the same a gas stream is forced through the water around the fuel assembly in the hood from its bottom to the top. However, the detection sensitivity is quite low even with this measure.

At the so called TELESCOPE-sipping, which is totally adapted to a BWR-reactor plant, a great amount of the water surrounding a damaged fuel assembly is pumped from a nozzle placed at or a doom placed around the upper part of the fuel assembly to be examined lifted up somewhat from the reactor core by a gripper at a telescope mast arrangement from the reactor core and water pumped from the nozzle is supplied to a measuring circuit having a little volume. The water is degased in order to make a gas detection on-line. The detection has a high measuring sensitivity.

This kind of sipping is described in the Swedish Patent No. 91015065, according to which a hood or a nozzle arrangement is placed in the region around the gripper at the upper part of a lifted fuel assembly. A pump sucks water from that region. The fuel assembly of a BWR-reactor plant is in itself closed to the surroundings so that the pumped water from the nozzle to a great extent comes from water streaming through the inside of the assembly. The fuel assembly lifted-up is through-flushed with reactor water and the gripper is rinsed-off. This is also the case when the fuel assembly, after having been lifted to a given position vertically, is held in this position or is relowered, and the analysis of leaking fission gases is then carried out.

The fuel assemblies in a PWR-reactor plant have quite another open structure than the closed assemblies in a BWR-reactor plant. A nozzle at the upper part of a fuel assembly of a PWR could not possibly have the function to collect water streaming around the fuel rods in the fuel assembly. The radiation is emitted from its sides. Therefore, the fuel assemblies of a PWR-reactor plant must be placed in a closed space when lifted from the reactor core.

An object of the invention is to provide a fuel leak detection for a PWR with a high sensitivity.

According to the invention the gas measuring circuit at an INMAST-sipping device is replaced by a water sampling circuit. Water surrounding the fuel assembly to be examined and then placed inside a lifting rod is pumped from the water inside of the rod to a water/gas separation device. The separated gas is then detected on-line in the same way as for the so called TELESCOPE-sipping for BWR-reactor plants.

BRIEF DESCRIPTION OF THE DRAWING

The invention will now be described in more detail with reference to the accompanying drawing, in which the FIGURE illustrates schematically a reactor vessel having fuel assemblies, and also shows an embodiment of an inventive arrangement.

DESCRIPTION OF THE PREFERRED EMBODIMENT

In the FIGURE, 1 designates a loading machine for fuel assemblies for a pressurized-water reactor, 2 the reactor hall floor along which the loading machine is movable, 3 the reactor vessel, 4 the reactor core, 5 a pool located above the reactor vessel with reactor water, and 6 the reactor water in the reactor vessel and in the pool. The loading machine is provided with a lifting mast 7 of preferably telescopic design. The mast 7 is cylindrical and has an internal chamber wide enough to house a fuel assembly. A gripping device 8 provided at the end of a wire 8' provided inside the mast 7 is adapted to grip a lifting handle on a fuel assembly 10 which in the illustrated case is being lifted out of the reactor core and drawn well into the mast by a motor 11. The mast with the fuel assembly 9 is lifted upp into the pool 5 so that the fuel assembly comes near the upper water level, but so that the fuel assembly is surrounded by water 12.

The mast counteracts that water which has passed the fuel assembly spreads to the area ouside the mast, which would mean that leaked-out fission products would be lost for the analysis. A hose 14 or other conduit extends from the upper part of the mast 7 to a little distance below the water level inside the mast but above the fuel assembly 9. The conduit 14 includes a pump 13 by means of which the water is sucked from the water 12 inside the mast 7, which is open in its lower end.

The reactor water is caused to stream inside the mast 7 from below as marked by arrows and to flow around and through the fuel assembly 9 by the action of the pump 13. The fuel assembly is all the time located below the water level.

Water is pumped by the pump 13 to a gas separator 22 in which gases present in the water are released therefrom by lowering the pressure and therewith decreasing the solubility of the gases in water. The gas separator 22 includes at least one gas space 23 having a small volume and one water reservoir 24. The gas space 23 and the water reservoir 24 are separated by means of a waterseal 25. In order to achieve a more effective release of the gases present in the samples in accordance with the present invention, the water is finely-divided, or atomized, with the aid of spray devices 26 mounted in the gas space 23, in conjunction with passing the water to the gas separator 22.

The gases released from the water, these gases possibly containing gaseous fission products, are mixed with a working gas present in the gas separator 22 and are pumped through a gas circuit 27 to a measuring chamber 28 in which the gases are analyzed for the occurrence of gaseous fission products with the aid of a detector which functions to detect radioactivity in gases. The detection result could be presented on a display 35. The degasified water is passed to the water reservoir 24 in which any radioactivity in the water could be detected separately (not shown). Alternatively, water samples can be sent to a separate laboratory for analysis. Then the degasified water is conducted back to the pool 5 through a hose 36.

In the case of low activity in the water samples, the enrichment of gaseous fission products in the detection system necessary for detection purposes is achieved by pumping large quantities of water sample through the gas separator 22 in which the water is degasified. The gas circuit 27 includes a pump 31 which functions to pump any gas present in the circuit 27 and the gas space 23 around said gas circuit 27 and the gas space 23, therewith enriching any gaseous fission products present.

To ensure that dry gas is delivered to the measuring chamber 28 for detecting radioactivity in gases, the gas circuit 27 conveniently includes a moisture separator 32, a gas dryer 33 and an iodine trap 34 between the gas space 23 and the measuring chamber 28.

While the invention has been described with reference to a specific embodiment, it will be understood by those skilled in the art that various changes may be made and equivalents may be substituted for elements thereof without departing from the true spirit and scope of the invention. In addition, modifications may be made without departing from the essential teachings of the invention as expressed in the accompanying claims.

We claim:

1. An arrangement for carrying out leak detection of a fuel assembly for a pressurized-water nuclear reactor, comprising:

a substantially vertical hollow mast means, in which said fuel assembly to be examined is housable;

means for drawing said fuel assembly to the inside of said mast means from its lower side;

means for lifting at least the part of said mast means housing said fuel assembly to a position in which said fuel assembly is provided near but below the water surface of water inside said nuclear reactor;

means for sucking water from a position inside said mast means above said fuel assembly;

gas separating means for separating gases present in said water sucked from the inside of said mast means; and gas analyzing means for analyzing the amount of gaseous fission products in said separated gas.

2. An arrangement according to claim 1, wherein said gas analyzing means comprises a gas circuit including a pump functioning to pump any gas present in said circuit and a gas space in said gas separating means around said gas circuit and said gas space, therewith enriching any gaseous fission products present in said water sucked from the inside of said mast means.

3. An arrangement according to claim 1, wherein said water suction device and associated fission product analyzing circuit are constructed to detect gaseous fission products that accompany said pumped water, wherein said suction device is adapted to deliver water from the inside of said mast means to said fission detection circuit, which includes a liquid container having a hose for degassified water, a gas detection circuit coupled to the upper part of said container, wherein said gas detection circuit is connected back to said container for enrichment of the fission gases in said gas detection circuit.

4. An arrangement according to claim 1, wherein said fission-gas detection circuit includes a gas separator which includes a gas space and a water reservoir which are mutually separated by a waterseal; a device for finely-dividing the water delivered to said gas space; a gas circuit connected to said gas space; and a measuring chamber located in said gas circuit and functioning to measure occurrent gaseous fission products.

5. An arrangement according to claim 4, wherein said gas circuit includes a moisture separator, a gas dryer and an iodine trap upstream of said measuring chamber as seen in the gas delivery direction.

6. An arrangement for carrying out leak detection of a fuel assembly below the surface of the water level in a pressurized-water nuclear reactor comprising:

a substantially vertical hollow mast having an open bottom for receiving said fuel assembly therein;

means associated with the mast for drawing the fuel assembly within the mast through the open bottom;

means for lifting the mast containing the fuel assembly to a position in which said fuel assembly is located near, but below the surface of the water level in the reactor;

means for circulating water from within the mast above said fuel assembly and below said water level;

means coupled to the circulating means for separating gasses in the water circulated from the mast; and analyzing means for analyzing the separated gas for fission products.

* * * * *